B. THOENS.
SPRING WHEEL.
APPLICATION FILED FEB. 6, 1912.

1,178,887.

Patented Apr. 11, 1916.

Witnesses:
B. M. Kent.
E. L. Greenewald

Inventor
Burchard Thoens
By Foster Freeman Watson &co.
Attys

UNITED STATES PATENT OFFICE.

BURCHARD THOENS, OF NEW YORK, N. Y.

SPRING-WHEEL.

1,178,887.

Specification of Letters Patent.  Patented Apr. 11, 1916.

Application filed February 6, 1912. Serial No. 675,790.

*To all whom it may concern:*

Be it known that I, BURCHARD THOENS, a subject of the Emperor of Germany, residing at New York, county and State of New York, have invented certain new and useful Improvements in Spring-Wheels, of which the following is a specification.

This invention relates to vehicle wheels and more particularly to wheels designed for use on motor-driven vehicles.

One of the objects of the invention is to provide a wheel capable of absorbing shocks, vibrations, etc., caused by obstructions in the roads and by uneven roads, without transmitting the shocks and vibrations to the body of the vehicle. By providing a wheel construction which absorbs the shocks and vibrations, riding in the vehicle is rendered much more agreeable and the life of the vehicle is greatly prolonged.

Another object is to provide a wheel which permits the hub to be rotated slightly relative to the rim in order to cushion the shocks or blows to the driving mechanism, due to a sudden application of the power, and to thereby impart motion to the wheel gradually.

Figure 1:
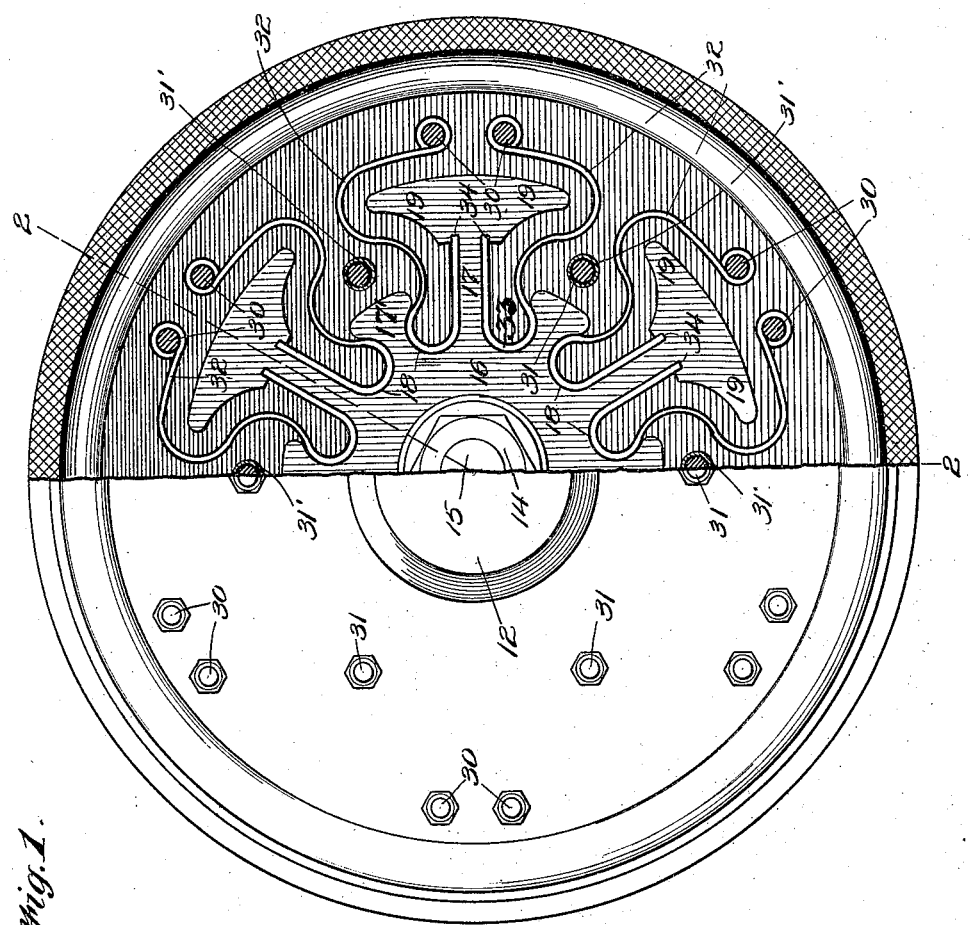
Figure 2:
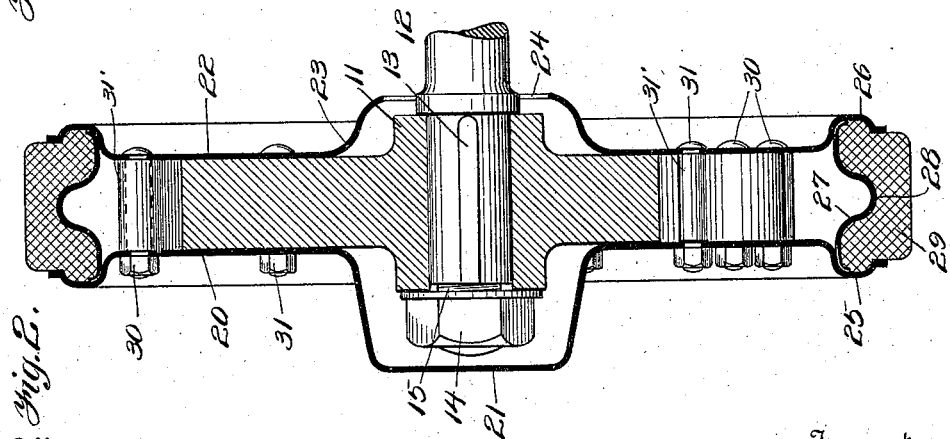

Other objects and features of novelty will be apparent from the following description taken in connection with the drawings, in which, Figure 1 is a composite view, one half of which shows the outer side of the wheel and the other half shows the wheel as it appears with the outer side plate removed; Fig. 2 is a section on the line 2—2 of Fig. 1.

Referring to the drawings, it will be observed that I have provided a hub member 11, which is mounted on an axle 12 and secured to the latter in any suitable manner, such as by means of the key 13 and the nut 14, which engages the reduced threaded portion 15 of the axle and bears against the outer end of the hub member 11. The hub member comprises a disk or hub 16 having circumferential recesses forming a series of radially arranged arms 17 and 17' between which are the curved recesses 18. At their outer ends the arms 17 have circumferentially extending projections 19.

On the outer side of the hub member is arranged a side-plate 20, having a central raised portion 21 which incloses and conceals the end of the axle and the nut 14. On the inner side of the hub member is a plate 22, having a central raised portion 23 provided with an opening 24, through which passes the axle 12, the opening 24 being sufficiently large to allow for the desired movement of the hub member relative to the plate 22. The plates 20 and 22 have grooves 25 and 26 in their adjacent sides and the inner sides of these grooves form seats for the edges of the felly 27, the edges being turned to conform to the contour of the grooves. The central portion of the felly 27 is provided with an outwardly extending ridge 28, which engages a corresponding recess in the tire 29, which has its side edges suitably formed to fit between the felly 27 and the grooves in the side plates 20 and 22. The central ridge 28 in the felly serves to prevent the tire from being dislodged when the wheel skids and the tire is subjected to excessive side thrusts. The ridge 28, therefore, and the portions of the tire which fit in the grooves 25, 26, securely hold the tire in position. The plates 20 and 22 are secured together by means of bolts 30 and 31, the bolts 30 being arranged in pairs adjacent the outer ends of the radial arms 17 and the bolts 31 being preferably arranged midway between the arms. Suitable sleeves 31' are arranged on bolts 31 and hold the plates 20 and 22 in spaced relation.

A series of pairs of complementary springs 32, preferably in the form of sinuous leaves, have one end pivotally or otherwise flexibly or inflexibly connected with the bolts 30 and extend around the circumferential projections 19 on the arms 17, and have their inner portions 33 reversely turned to form hooks, the curved portions of which snugly fit in the recesses 18 and the ends of which extend along the sides of the arms 17 and engage small recesses 34 on the inner side of the extensions 19. This construction and arrangement of the springs is clearly illustrated in the right-hand half of Fig. 1 and it will be seen that when the wheel strikes an obstruction the plates 20 and 22 will be moved upwardly relative to the axle and the hub member 11 and the springs 32 will be distorted and also serve as buffers for the extensions 19.

The springs 32 are securely held in the recesses 18 and 34 and are adapted to be inserted into these recesses from the side of the hub member 11. By this arrangement and by having the springs pivotally connected with the bolts 30, it will be seen that I have provided a very flexible construction in which all of the springs simultaneously coöperate to support the load on the wheel and also to absorb the shocks and vibrations.

By removing the nuts from the bolts 30 and 31, the outer plate 20 may be readily removed and the felly carrying the tire 28 taken off. The construction of the felly securely holds the tire thereon and also permits the same to be readily removed by slightly stretching the tire so as to slip it over the central ridge on the felly.

Having thus described my invention, what I claim is:

1. A vehicle wheel comprising a pair of circular plates, means rigidly connecting said plates together in spaced relation, a hub member having a web portion between and guided by said plates and movable relatively thereto, said web comprising a series of arms, and a corresponding series of pairs of complementary springs, the springs of each pair being rigidly interlocked with the web on opposite sides of the arms and having their outer ends connected with the side plates.

2. A vehicle wheel comprising a pair of circular plates, means rigidly connecting said plates together in spaced relation, a hub member having a web portion between and guided by said plates and movable relatively thereto, said web comprising a series of radial arms, and a corresponding series of pairs of complementary springs, said springs being sinuous and having their inner ends rigidly interlocked with the web on opposite sides of their respective arms and their outer ends connected with the side plates.

3. A vehicle wheel comprising a pair of circular plates, means rigidly connecting said plates together in spaced relation, a hub member having a web portion between and guided by said plates and movable relatively thereto, said web comprising a series of radial arms, a corresponding series of pairs of complementary springs, said springs being sinuous, and having their inner ends interlocked with the web on opposite sides of their respective arms and their outer ends connected with the side plates, and said arms having lateral extensions at their outer ends located within their respective springs and adapted to coöperate with the springs to form buffers.

4. A vehicle wheel comprising a pair of circular plates, means rigidly connecting said plates together in spaced relation, a hub member having a web portion between and guided by said plates and movable relatively thereto, said web comprising a series of radial arms, a corresponding series of pairs of complementary springs, said springs being sinuous and having their inner ends interlocked with the web on opposite sides of their respective arms and their outer ends connected with the side plates, and said arms having T-shaped extremities lying within their respective pairs of springs and having outline substantially parallel with said springs for the purpose set forth.

5. A wheel comprising side plates, a hub member arranged between said plates and having radially arranged arms provided with circumferentially extending projections at their outer ends, bolts for securing said plates together and arranged in pairs adjacent the outer ends of said arms, and sinuous leaf springs arranged on opposite sides of said arms and rigidly connected therewith and having pivotal connection with said bolts, said springs being arranged to act as buffers for the projections on said arms.

6. A wheel comprising side plates, a hub member arranged between said plates and having radially arranged arms provided with circumferentially extending projections at their outer ends, bolts for securing said plates together and arranged in pairs adjacent the outer ends of said arms, and leaf springs having pivotal connection with said bolts and bent around the projections on said arms and having their inner portions reversely turned and arranged in recesses in said hub member and having one end engaging the inner side of said projections.

7. A wheel comprising side plates, a hub member arranged between said plates and having radially arranged arms provided with circumferentially extending projections at their outer ends, bolts for securing said plates together and arranged in pairs adjacent the outer ends of said arms, and sinuous leaf springs having one end pivotally connected with said bolts and extending around said projections and adapted to act as buffers for the latter, the other end portions of said springs being reversely bent to form hooks having their rounded portions securely held in corresponding recesses in the hub member and their ends engaging and held by said projections.

8. A wheel comprising inner and outer side plates, a hub member arranged between said plates and having radially extending arms, bolts connecting said plates together, springs rigidly connected with said hub member and pivotally connected with said bolts and adapted to serve as buffers for said arms, an axle secured in said hub member, means arranged on the outer side of said hub member for securing the axle thereto, and said outer plate having a central outwardly extending cupped portion inclosing and concealing said axle securing means.

In testimony whereof I affix my signature in presence of two witnesses.

BURCHARD THOENS.

Witnesses:
JOSEPHINE PERNICE,
MAURICE BLOCH.

Copies of this trade-mark may be obtained for five cents each, by addressing the "Commissioner of Patents, Washington, D. C."